US012651734B2

(12) United States Patent
Ivosev et al.

(10) Patent No.: US 12,651,734 B2
(45) Date of Patent: Jun. 9, 2026

(54) METHOD FOR LINEAR QUANTITATIVE DYNAMIC RANGE EXTENSION

(71) Applicant: DH TECHNOLOGIES DEVELOPMENT PTE. LTD., Singapore (SG)

(72) Inventors: Gordana Ivosev, Etobicoke (CA); Stephen A. Tate, Barrie (CA); Yang Kang, Richmond Hill (CA); Nic G. Bloomfield, Newmarket (CA)

(73) Assignee: DH Technologies Development Pte. Ltd., Singapore (SG)

( * ) Notice: Subject to any disclaimer, the term of this patent is extended or adjusted under 35 U.S.C. 154(b) by 284 days.

(21) Appl. No.: 18/551,706

(22) PCT Filed: Mar. 14, 2022

(86) PCT No.: PCT/IB2022/052280
§ 371 (c)(1),
(2) Date: Sep. 21, 2023

(87) PCT Pub. No.: WO2022/208208
PCT Pub. Date: Oct. 6, 2022

(65) Prior Publication Data

US 2024/0177982 A1 May 30, 2024

Related U.S. Application Data

(60) Provisional application No. 63/167,916, filed on Mar. 30, 2021.

(51) Int. Cl.
*H01J 49/00* (2006.01)

(52) U.S. Cl.
CPC ...... *H01J 49/0072* (2013.01); *H01J 49/0036* (2013.01)

(58) Field of Classification Search
CPC . H01J 49/0072; H01J 49/0031; H01J 49/0036
See application file for complete search history.

(56) References Cited

U.S. PATENT DOCUMENTS 8,809,770 B2 8/2014 Bonner et al.
2020/0312644 A1* 10/2020 Bonner ............... H01J 49/0036

OTHER PUBLICATIONS

International Search Report and Written Opinion for PCT/IB2022/052280, mailed Jun. 28, 2022.

(Continued)

*Primary Examiner* — David E Smith
(74) *Attorney, Agent, or Firm* — Merchant & Gould P.C.

(57) ABSTRACT

An uncertainty weighted average of the equalized amounts of two or more quantifier ions is calculated from a quantitation experiment itself. n known i ions of a compound are mass analyzed over time in each of m different samples, producing n XIC peaks for each of the m samples. A reference ion j is selected that is a j ion of the n i ions or a hypothetical ion j. A ratio r(j,i) of a peak area of the j ion to a peak area of each ion of the n i ions is calculated for each of the m samples, producing m r(j,i) ratios for each of the n i ions. An expected ratio $r^q(j,i)$ is calculated for each ion of the n i ions from the m r(j,i) ratios for each of the n i ions. For each sample, the uncertainty weighted average is calculated using $r^q(j,i)$.

15 Claims, 14 Drawing Sheets

(56) References Cited

OTHER PUBLICATIONS

Onsongo Getiria et al. "LTQ-iQuant: A Freely Available Software Pipeline for Automated and Accurate Protein Quantification of Isobaric Tagged Peptide Data from LTQ Instruments," Proteomics, vol. 10, No. 19, Sep. 7, 2010, pp. 3533-3538, XP055925976, DE.

Hultin-Rosenberg Lina et al. "Defining, Comparing, and Improving iTRAQ Quantification in Mass Spectrometry Proteomics Data," Molecular & Cellular Proteomics, vol. 12, No. 7, Jun. 21, 2012, pp. 2021-2031, XP055925991, US.

PCT International Preliminary Report on Patentability in Application PCT/IB2022/052280, mailed Oct. 12, 2023, 8 pages.

* cited by examiner

300

600

METHOD FOR LINEAR QUANTITATIVE DYNAMIC RANGE EXTENSION

RELATED APPLICATIONS

This application is a National Stage Application of PCT/IB2022/052280, filed Mar. 14, 2022, which claims the benefit of U.S. Provisional Patent Application No. 63/167,916, filed Mar. 30, 2021, the entire disclosures of which are incorporated herein by reference in their entireties. To the extent appropriate, a claim of priority is made to each of the above disclosed applications.

INTRODUCTION

The teachings herein relate to extending the quantifiable linear dynamic range of a compound of interest in liquid chromatography-mass spectrometry (LC-MS) or liquid chromatography-mass spectrometry/mass spectrometry (LC-MS/MS). More particularly the teachings herein relate to systems and methods for extending the quantifiable range of a compound of interest by using an uncertainty weighted average of the inferred or equalized amounts of two or more quantifier ions obtained from a quantitation experiment itself.

The systems and methods herein can be performed in conjunction with a processor, controller, or computer system, such as the computer system of FIG. 1.

Extended Linear Dynamic Range Using Multiple Quantifiers

The linear dynamic range (LDR) for quantitation is determined by the linearity of the sample concentrations to the ion signal response in mass spectrometry. The LDR results can be varied by choosing different target ions (quantifier ions) from the same sample with various sensitivity levels due to differences in "ion efficiency." For any mass spectrometer, ion efficiency depends on a few factors including, but not limited to, ionization efficiency, fragmentation efficiency, and detection efficiency. For a time-of-flight (TOF) mass spectrometer, ion efficiency also depends on TOF duty cycle losses, for example.

FIG. 2 is an exemplary plot 200 of ion intensity versus sample concentration showing how LDR results can be varied by choosing different quantifier ions upon which embodiments of the present invention may be implemented. Plot 200 shows the LDRs for quantifier ion 210 and quantifier ion 220. The slope of the LDR of quantifier ion 210 is close to 1. This means that quantifier ion 210 has a high ion efficiency. Any change in sample concentration produces a proportional change in ion intensity. Therefore, quantifier ion 210 has a high detection sensitivity.

Another advantage of ions with high ion efficiency, like quantifier ion 210, is that they produce a concentration variation (CV) that is proportional to the mass spectrometry signal variation. For example, mass spectrometry signal variation 230 produces a proportional CV 231 for quantifier ion 210.

Unfortunately, ions with high ion efficiency, like quantifier ion 210, quickly reach the upper saturation limit of the mass spectrometer. This means that their LDR is shorter than other ions and, in turn, their sample concentration range is also shorter. In plot 200, the LDR of quantifier ion 210 produces sample concentration range 241.

In contrast, the slope of the LDR of quantifier ion 220 is much less than 1. This means that quantifier ion 220 has a lower ion efficiency than quantifier ion 210. Any change in sample concentration produces a smaller change in ion intensity. Therefore, quantifier ion 220 has a lower detection sensitivity than quantifier ion 210.

Another disadvantage of ions with a lower ion efficiency, like quantifier ion 220, is that in response to a mass spectrometry signal variation they produce a CV that is much larger. For example, mass spectrometry signal variation 230 produces a much larger CV 232 for quantifier ion 220 than CV 231 of quantifier ion 210.

However, one advantage of a lower ion efficiency is a larger sample concentration range. Ions with lower ion efficiency, like quantifier ion 220, take a longer time to reach the upper saturation limit of the mass spectrometer. This means that their LDR is longer and, in turn, their sample concentration range is also longer. In plot 200, the LDR of quantifier ion 220 produces sample concentration range 242, which is much larger than sample concentration range 241 of quantifier ion 210.

Conventionally, the LDR of a compound has been extended using more than one quantifier ion. In tests to generate a calibration curve, however, the specified transitions or product ions used need to be carefully selected.

FIG. 3 is an exemplary plot 300 showing the complete intensity versus sample concentration response of the two ions of FIG. 2 upon which embodiments of the present invention may be implemented. Typically, the selected product ion which has the highest ion efficiency is used to extend the LDR limit at the low end of sample concentration. For example, line 310 is the intensity versus sample concentration response of quantifier ion 210 of FIG. 2 and can be used to extend the LDR limit at the low end of sample concentration. Line 310, however, would be limited to just the low concentration end of the total LDR range since the intensity reaches the upper detection limit in few orders of magnitude of the sample concentration.

Line 320 is the intensity versus sample concentration response of quantifier ion 210 of FIG. 2 and can be used to extend the LDR limit at the higher end of sample concentration. Recall that line 320 represents the response of a lower-intensity product ion with a lower "ion efficiency."

To generate a good calibration curve for multiple quantifier ions, efforts have included, 1) gathering information such as quantifier ion mass-to-charge ratios (m/z) and quantifier ion intensity ratios: 2) careful selection of quantifier ions at the low and high end: 3) using quantifier ions with intensities within the system saturation limit: and 4) a manual check if the correct quantifier ions are selected at the low end to avoid the selection of any interfering ions based on retention time (RT) information.

Optimized utilization of different quantifier ions when generating calibration curves has the potential to extend the total LDR range in both the low and high end of the sample concentration range. However, to achieve this requires significant additional effort in method optimization, data acquisition, and data processing.

As a result, additional systems and methods for producing an optimized quantitation solution with the wise use of correct quantifier ions to confidently achieve high linear dynamic range with good accuracy and without significant additional effort in method optimization, data acquisition, and data processing is needed.

LC-MS and LC-MS/MS Background

Mass spectrometry (MS) is an analytical technique for the detection and quantitation of chemical compounds based on the analysis of mass-to-charge ratios (m/z) of ions formed from those compounds. The combination of mass spectrometry (MS) and liquid chromatography (LC) is an important analytical tool for the identification and quantitation of compounds within a mixture. Generally, in liquid chromatography, a fluid sample under analysis is passed through a column filled with a chemically-treated solid adsorbent material (typically in the form of small solid particles, e.g., silica). Due to slightly different interactions of components of the mixture with the solid adsorbent material (typically referred to as the stationary phase), the different components can have different transit (elution) times through the packed column, resulting in separation of the various components. In LC-MS, the effluent exiting the LC column can be continuously subjected to mass spectrometric analysis. The data from this analysis can be processed to generate an extracted ion chromatogram (XIC), which can depict detected ion intensity (a measure of the number of detected ions of one or more particular analytes) as a function of retention time.

In some cases, the LC effluent can be subjected to tandem mass spectrometry (or mass spectrometry/mass spectrometry MS/MS) for the identification of product ions corresponding to the peaks in the XIC. For example, the precursor ions can be selected based on their mass/charge ratio to be subjected to subsequent stages of mass analysis. For example, the selected precursor ions can be fragmented (e.g., via collision-induced dissociation), and the fragmented ions (product ions) can be analyzed via a subsequent stage of mass spectrometry.

Tandem Mass Spectrometry or MS/MS Background

Tandem mass spectrometry or MS/MS involves ionization of one or more compounds of interest from a sample, selection of one or more precursor ions of the one or more compounds, fragmentation of the one or more precursor ions into product ions, and mass analysis of the product ions.

Tandem mass spectrometry can provide both qualitative and quantitative information. The product ion spectrum can be used to identify a molecule of interest. The intensity of one or more product ions can be used to quantitate the amount of the compound present in a sample.

A large number of different types of experimental methods or workflows can be performed using a tandem mass spectrometer. These workflows can include, but are not limited to, targeted acquisition, information dependent acquisition (IDA) or data dependent acquisition (DDA), and data independent acquisition (DIA).

In a targeted acquisition method, one or more transitions of a precursor ion to a product ion are predefined for a compound of interest. As a sample is being introduced into the tandem mass spectrometer, the one or more transitions are interrogated during each time period or cycle of a plurality of time periods or cycles. In other words, the mass spectrometer selects and fragments the precursor ion of each transition and performs a targeted mass analysis for the product ion of the transition. As a result, a chromatogram (the variation of the intensity with retention time) is produced for each transition. Targeted acquisition methods include, but are not limited to, multiple reaction monitoring (MRM) and selected reaction monitoring (SRM).

MRM experiments are typically performed using "low resolution" instruments that include, but are not limited to, triple quadrupole (QqQ) or quadrupole linear ion trap (QqLIT) devices. With the advent of "high resolution" instruments, there was a desire to collect MS and MS/MS using workflows that are similar to QqQ/QqLIT systems. High-resolution instruments include, but are not limited to, quadrupole time-of-flight (QqTOF) or orbitrap devices. These high-resolution instruments also provide new functionality.

MRM on QqQ/QqLIT systems is the standard mass spectrometric technique of choice for targeted quantification in all application areas, due to its ability to provide the highest specificity and sensitivity for the detection of specific components in complex mixtures. However, the speed and sensitivity of today's accurate mass systems have enabled a new quantification strategy with similar performance characteristics. In this strategy (termed MRM high resolution (MRM-HR) or parallel reaction monitoring (PRM)), looped MS/MS spectra are collected at high-resolution with short accumulation times, and then fragment ions (product ions) are extracted post-acquisition to generate MRM-like peaks for integration and quantification. With instrumentation like the TRIPLETOF® Systems of AB SCIEX™, this targeted technique is sensitive and fast enough to enable quantitative performance similar to higher-end triple quadrupole instruments, with full fragmentation data measured at high resolution and high mass accuracy.

In other words, in methods such as MRM-HR, a high-resolution precursor ion mass spectrum is obtained, one or more precursor ions are selected and fragmented, and a high-resolution full product ion spectrum is obtained for each selected precursor ion. A full product ion spectrum is collected for each selected precursor ion but a product ion mass of interest can be specified and everything other than the mass window of the product ion mass of interest can be discarded.

In an IDA (or DDA) method, a user can specify criteria for collecting mass spectra of product ions while a sample is being introduced into the tandem mass spectrometer. For example, in an IDA method a precursor ion or mass spectrometry (MS) survey scan is performed to generate a precursor ion peak list. The user can select criteria to filter the peak list for a subset of the precursor ions on the peak list. The survey scan and peak list are periodically refreshed or updated, and MS/MS is then performed on each precursor ion of the subset of precursor ions. A product ion spectrum is produced for each precursor ion. MS/MS is repeatedly performed on the precursor ions of the subset of precursor ions as the sample is being introduced into the tandem mass spectrometer.

In proteomics and many other applications, however, the complexity and dynamic range of compounds is very large. This poses challenges for traditional targeted and IDA methods, requiring very high-speed MS/MS acquisition to deeply interrogate the sample in order to both identify and quantify a broad range of analytes.

As a result, DIA methods, the third broad category of tandem mass spectrometry, were developed. These DIA methods have been used to increase the reproducibility and comprehensiveness of data collection from complex samples. DIA methods can also be called non-specific fragmentation methods. In a DIA method the actions of the tandem mass spectrometer are not varied among MS/MS scans based on data acquired in a previous precursor or survey scan. Instead, a precursor ion mass range is selected. A precursor ion mass selection window is then stepped across the precursor ion mass range. All precursor ions in the precursor ion mass selection window are fragmented and all of the product ions of all of the precursor ions in the precursor ion mass selection window are mass analyzed.

The precursor ion mass selection window used to scan the mass range can be narrow so that the likelihood of multiple precursors within the window is small. This type of DIA method is called, for example, MS/MS$^{ALL}$. In an MS/MS$^{ALL}$ method, a precursor ion mass selection window of about 1 amu is scanned or stepped across an entire mass range. A product ion spectrum is produced for each 1 amu precursor mass window. The time it takes to analyze or scan the entire mass range once is referred to as one scan cycle. Scanning a narrow precursor ion mass selection window across a wide precursor ion mass range during each cycle, however, can take a long time and is not practical for some instruments and experiments.

As a result, a larger precursor ion mass selection window, or selection window with a greater width, is stepped across the entire precursor mass range. This type of DIA method is called, for example, SWATH acquisition. In a SWATH acquisition, the precursor ion mass selection window stepped across the precursor mass range in each cycle may have a width of 5-25 amu, or even larger. Like the MS/MS$^{ALL}$ method, all of the precursor ions in each precursor ion mass selection window are fragmented, and all of the product ions of all of the precursor ions in each mass selection window are mass analyzed. However, because a wider precursor ion mass selection window is used, the cycle time can be significantly reduced in comparison to the cycle time of the MS/MS$^{ALL}$ method.

U.S. Pat. No. 8,809,770 describes how SWATH acquisition can be used to provide quantitative and qualitative information about the precursor ions of compounds of interest. In particular, the product ions found from fragmenting a precursor ion mass selection window are compared to a database of known product ions of compounds of interest. In addition, ion traces or extracted ion chromatograms (XICs) of the product ions found from fragmenting a precursor ion mass selection window are analyzed to provide quantitative and qualitative information.

Quantitation Dynamic Range Background

Quantitation by mass spectrometry typically uses MRM or MRM-HR and LC as an introduction system. A response, for example from a particular MRM transition, is measured during the time when the compound of interest is expected to elute from the LC column. A chromatogram is generated, processed to determine the area of any peaks present in the chromatogram and the corresponding quantity is calculated from a calibration curve or from the ratio to a standard of known concertation. It is well known that a measured signal of a compound or analyte of interest will at first increase linearly with concentration, but will eventually reach a plateau that limits the maximum concentration that can be measured. The concentration range that gives a linear response is known as the linear dynamic range. This signal plateau or roll over is generally attributed to saturation in the ion source, the detector, or the column, such that increasing the concentration of the compound of interest no longer causes an increase in the number of ions created or detected.

This signal plateau may also be attributed to the formation of adducts, dimers, trimers, multiply charged ions, and other species. While many compounds are ionized by the addition (positive mode) or removal (negative mode) of protons to give ions of the form $M+H^+$ and $M-H^-$, other species can be added, for example, $Na^+$, $NH_4^+$, $K^+$, $CHO_2^-$, $C_2H_3O_2^-$, etc.; these forms are generally known as adducts. These ions can arise from ionic buffers added to the LC solvents to improve separation (for example sodium or ammonium formate or acetate) but sodium and potassium can also leach from glassware. Further, species containing multiple molecules (dimers and trimers) can also be observed, e.g., $2M+H^+$, $2M+Na^+$, $3M+H^+$, etc. and all the molecular ion(s) may fragment in the ion introduction optics generating fragment ions corresponding to the loss of $H_2O$, $CO_2$, etc. In larger species, such as proteins and peptides, multiply charged ions such as $M+2H^{2+}$, $M+3H3^+$, etc. can also be formed.

SUMMARY

A system, method, and computer program product are disclosed for calculating an uncertainty weighted average of the equalized amounts of two or more quantifier ions from a quantitation experiment itself. The system includes a mass spectrometer and a processor.

The mass spectrometer mass analyzes n known i ions of a compound of interest over time in each of m different experimental samples, producing XIC peaks. The XIC peaks include n peaks for each of the m different samples.

The processor selects a reference ion j that is a j ion of the n i ions or a hypothetical ion j. The processor calculates a ratio r(j,i) of a peak area of the j ion to a peak area of each ion of the n i ions for each of the m samples, producing m r(j,i) ratios for each of the n i ions. The processor calculates an expected ratio r(j,i) for each ion of the n i ions from the m r(j,i) ratios for each of the n i ions. Finally, the processor calculates an uncertainty weighted average quantity, X, equalized to the j ion from $$X = \frac{1}{\sum_{i=1:n} w_i} \sum_{i=1:n} w_i \times r^q(j, i) \times A_i,$$

where $w_i$ is an uncertainty weight between 0 and 1 for each ion of the n i ions for each sample with a value closer to 1 meaning less uncertainty and a value closer to 0 meaning more uncertainty.

These and other features of the applicant's teachings are set forth herein.

BRIEF DESCRIPTION OF THE DRAWINGS

The skilled artisan will understand that the drawings, described below, are for illustration purposes only. The drawings are not intended to limit the scope of the present teachings in any way.

Figure 1:
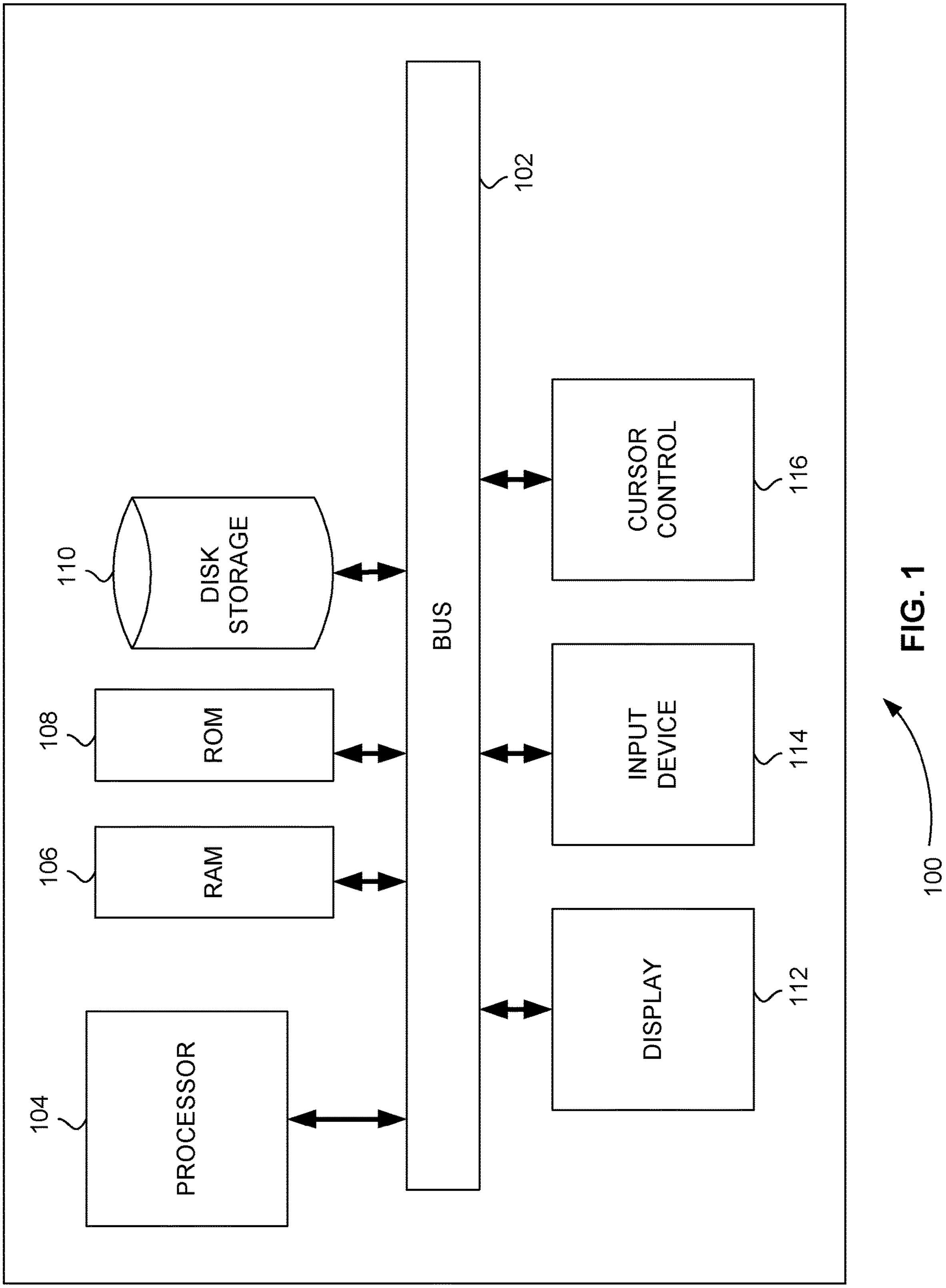
FIG. 1 is a block diagram that illustrates a computer system, upon which embodiments of the present teachings may be implemented.

Before one or more embodiments of the present teachings are described in detail, one skilled in the art will appreciate that the present teachings are not limited in their application to the details of construction, the arrangements of components, and the arrangement of steps set forth in the following detailed description or illustrated in the drawings. Also, it is to be understood that the phraseology and terminology used herein is for the purpose of description and should not be regarded as limiting.

DESCRIPTION OF VARIOUS EMBODIMENTS

Computer-Implemented System

FIG. 1 is a block diagram that illustrates a computer system 100, upon which embodiments of the present teachings may be implemented. Computer system 100 includes a bus 102 or other communication mechanism for communicating information, and a processor 104 coupled with bus 102 for processing information. Computer system 100 also includes a memory 106, which can be a random-access memory (RAM) or other dynamic storage device, coupled to bus 102 for storing instructions to be executed by processor 104. Memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or liquid crystal display (LCD), for displaying information to a computer user. An input device 114, including alphanumeric and other keys, is coupled to bus 102 for communicating information and command selections to processor 104. Another type of user input device is cursor control 116, such as a mouse, a trackball or cursor direction keys for communicating direction information and command selections to processor 104 and for controlling cursor movement on display 112.

A computer system 100 can perform the present teachings. Consistent with certain implementations of the present teachings, results are provided by computer system 100 in response to processor 104 executing one or more sequences of one or more instructions contained in memory 106. Such instructions may be read into memory 106 from another computer-readable medium, such as storage device 110. Execution of the sequences of instructions contained in memory 106 causes processor 104 to perform the process described herein. Alternatively, hard-wired circuitry may be used in place of or in combination with software instructions to implement the present teachings. Thus, implementations of the present teachings are not limited to any specific combination of hardware circuitry and software.

The term "computer-readable medium" or "computer program product" as used herein refers to any media that participates in providing instructions to processor 104 for execution. The terms "computer-readable medium" and "computer program product" are used interchangeably throughout this written description. Such a medium may take many forms, including but not limited to, non-volatile media, volatile media, and precursor ion mass selection media. Non-volatile media includes, for example, optical or magnetic disks, such as storage device 110. Volatile media includes dynamic memory, such as memory 106.

Common forms of computer-readable media include, for example, a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read.

Various forms of computer readable media may be involved in carrying one or more sequences of one or more instructions to processor 104 for execution. For example, the instructions may initially be carried on the magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to memory 106, from which processor 104 retrieves and executes the instructions. The instructions received by memory 106 may optionally be stored on storage device 110 either before or after execution by processor 104.

In accordance with various embodiments, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed.

The following descriptions of various implementations of the present teachings have been presented for purposes of illustration and description. It is not exhaustive and does not limit the present teachings to the precise form disclosed. Modifications and variations are possible in light of the above teachings or may be acquired from practicing of the present teachings. Additionally, the described implementation includes software but the present teachings may be implemented as a combination of hardware and software or in hardware alone. The present teachings may be implemented with both object-oriented and non-object-oriented programming systems.

Extending Dynamic Range Using Most Likely Ratio

As described above, the linear dynamic range (LDR) for quantitation is determined by the linearity of the sample concentrations to ion signal responses in mass spectrometry. The LDR results can be varied by choosing different target ions (quantifier ions) from the same sample with various sensitivity levels due to differences in "ion efficiency."

Conventionally, the LDR of a compound has been extended using more than quantifier ion. Optimized utilization of different quantifier ions when generating calibration curves has the potential to extend the total LDR range in both the low and high end of the sample concentration range. However, to achieve this requires significant additional effort in method optimization, data acquisition, and data processing.

As a result, additional systems and methods for producing an optimized quantitation solution with the wise use of correct quantifier ions to confidently achieve high linear dynamic range with good accuracy and without significant additional effort in method optimization, data acquisition, and data processing is needed.

In various embodiments, relations or ratios between two or more quantifier ions of an analyte or compound of interest are discovered from experimental data. The measured quantities of the two or more quantifier ions are equalized using the ratios. Finally, the equalized quantities are combined into a consensus quantity.

More than one ion is extracted for quantitation. Compound quantifier ions typically include product ions of the compound of interest. However, isotopes of a precursor ion or any combination of product ions and isotopes can be used.

Quantifier ions typically do not have identical ion efficiency (likelihood of fragment ion generation, for example) or natural abundance (isotopes), resulting in a significant difference in observed intensity among such ions for a given precursor molecule amount. In other words, for X molecules of a compound of interest, a mass spectrometer will ionize $X^q(i)$ ions of a quantifier ion (i), where $X^q(i)<=X$, and $X^q(1)<=X^q(2)<=X^q(3)<= \ldots <=X^q(n)<=X$.

Figure 2:
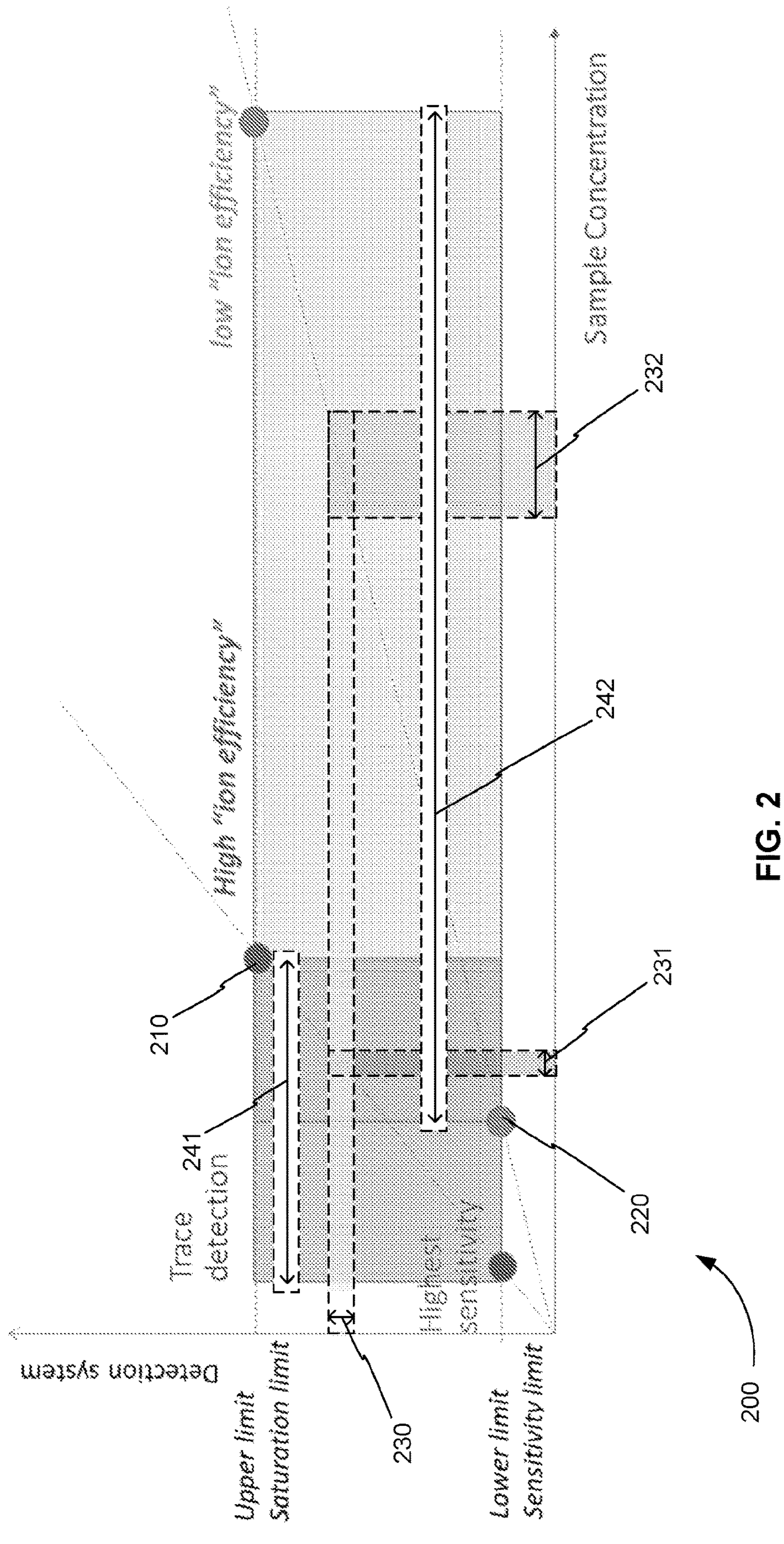
FIG. 2 is an exemplary plot of ion intensity versus sample concentration showing how linear dynamic range (LDR) results can be varied by choosing different quantifier ions upon which embodiments of the present invention may be implemented.
Figure 3:
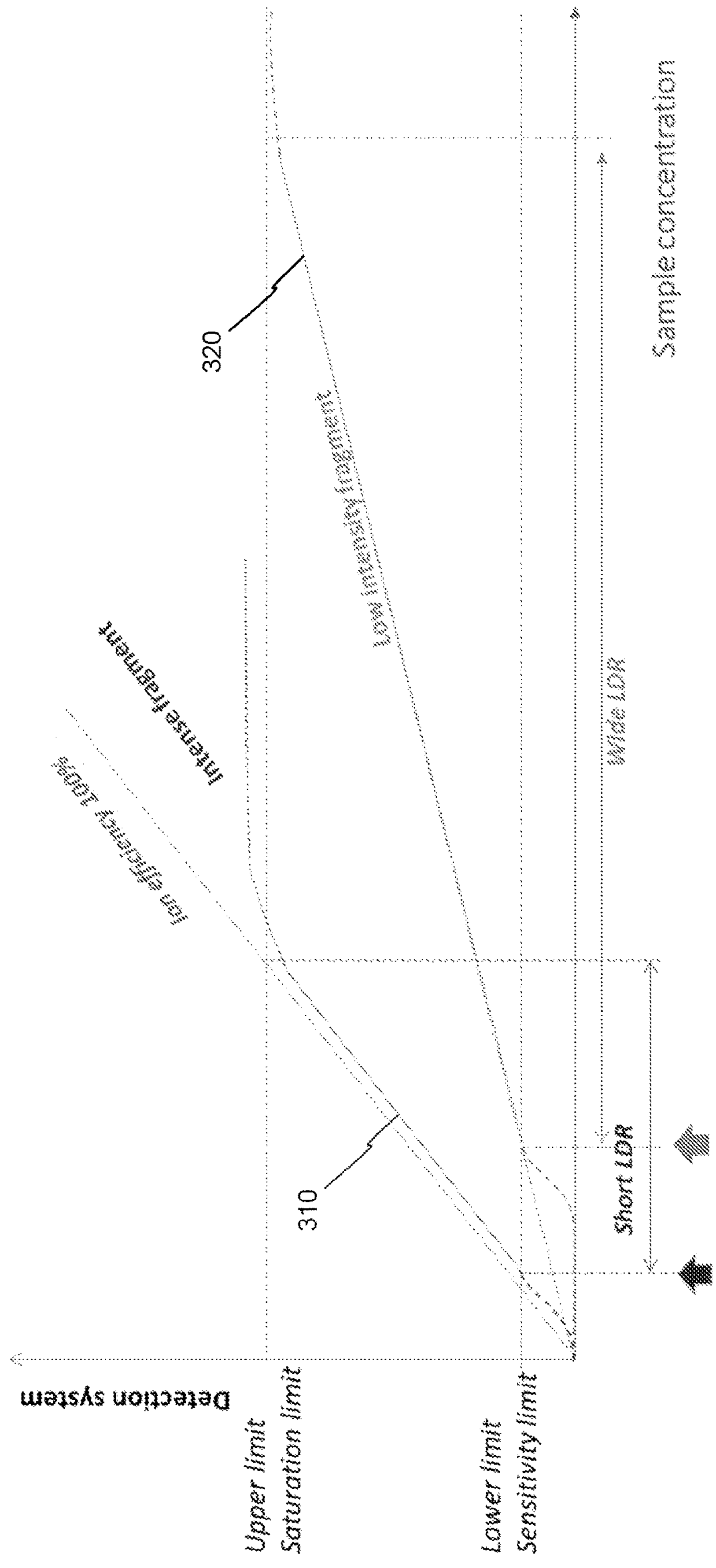
FIG. 3 is an exemplary plot showing the complete intensity versus sample concentration response of the two ions of FIG. 2 upon which embodiments of the present invention may be implemented.

The relation or ratio between two quantifier ions i and j is expressed as $r^q(j,i)=X^q(j)/X^q(i)$. In various embodiments, quantifier ions are selected so that $X^q(1)<<X^q(n)$. One such scenario is demonstrated in FIG. 2. Any quantifier ion can be used to infer (quantitate) the compound of interest.

Conventionally, quantitation has been performed using a single quantifier ion or using a sum of two or more quantifier ions. When using a single quantifier, typically the quantifier ion with the largest amount dynamic range (like a low efficiency ion) is used, or a quantifier ion that has the best linear dynamic range overlap with the range of interest of the compound of interest is used.

The motivation for using a sum of two or more quantifier ions is to reduce the measurement variability by intensity-weighted amount. Although it is sometimes, incorrectly expected to extend the LDR, summation does not typically affect LDR. It does, however, affect the inferred variance in the case where $r^q(j,i)\sim 1$. Also, if quantifier ion responses are significantly different ($r^q(j,i)<<1$), the LDR is dominated by the most abundant quantifier ion.

In various embodiments, LDR extension is possible using a sum of two or more quantifier ions. For example, LDR extension is possible if the selected quantifier ions have significantly different ion responses. These different ion responses can be due to different fragmentation efficiencies of product ions, mass spectrometry chemical properties like isotope ratio and charge cluster ratio, for example, and other reasons, such as the use of on/off Zeno pulsing in TOF experiments.

LDR extension is also possible if $r^q(j,i)$ is known or can be determined for all quantifier ions. Isotope abundance ratios are known, so $r^q(j,i)$ is known among isotopes. Also, it is well known that $r^q(j,i)$ can be determined for all quantifier ions from a dedicated experiment. For example, product ion ratios can be determined from an IDA experiment.

In various embodiments, however, $r^q(j,i)$ can be estimated for all quantifier ions from a quantitation experiment itself. Heretofore, this was not thought possible. In various embodiments, this estimation is possible, if there are enough measurement points or samples, using the most likely ratio (MLR). MLR is the concept that, among a large number of samples, there is only one way for the ratio to be the same and there are many ways for it to be different. In other words, if the ratio deviates among a large number of samples, it will deviate in different amounts of variation. For example, in a histogram of the observed ratio among samples, the ratio that is observed most often is most likely the correct ratio. Since the MLR used here is mainly directed to product ions found through using high collision energy fragmentation, isotopes of product ions found through using high collision energy fragmentation, or isotopes of precursor ions found using low collision energy fragmentation, it can be referred to as fragment MLR (FMLR).

Given an FMLR or expected $r^q(j,i)$, where i, j are any quantifier ion pairs from a set of quantifier ions for a compound of interest, and a measurement uncertainty, $w_i$, an amount of a compound of interest, X, is inferred as uncertainty weighted average of inferred amounts by all quantifier ions for the compound using:

$$X = \frac{1}{\sum_{i=1:n} w_i} \sum_{i=1:n} w_i * r^q(j, i) * \text{Area}(i)$$

where uncertainty weight $w_i\sim 1$, when the quantifier ion i measurement has low uncertainty, and where uncertainty weight $w_i\sim 0$ when the quantifier ion measurement uncertainty is high. The quantity $r^q(j,i)$*Area(i) is the inferred or equalized compound amount $X^q$ from a quantifier ion i, where j annotates some reference ion (one with the smallest maximum area difference with any other ion. for example). The ratio is $r^q(j,i)$ is the known or estimated ion ratio between the measured ion i and some reference ion j, as explained above.

In various embodiments, uncertainty, $w_i$, can be modeled to incorporate multiple factors including, but not limited to, instrument detection system measurement uncertainty, feature detection, and integration uncertainty. The instrument detection system uncertainty component can be calculated in real-time or post-acquisition from measured data along the available dimensions (LC time or m/z) considering instrument detection system dynamic range characteristics.

In a preferred embodiment, uncertainty weight $w_i$ is $$w_i^{Fmlr},$$

calculated from a set of dilution measurements or preferably from a quantitation experiment itself when the number of samples is sufficient. Theoretically, a number of experiments greater than 3 is sufficient, but, practically, more than 3 experiments are preferred.

Specifically, $$w_i^{Fmlr}$$

is determined by comparing the r(j,i) calculated for each ion i of the n ions for each sample to the expected $r^q(j,i)$. A value closer to 1 is assigned to more equivalent ratios and a value closer to 0 is assigned to less equivalent ratios. This is done, for example, by calculating a histogram of the m ratios, r(j,i), for each ion, i, that provides the number of occurrences of each ratio of the m ratios for each ion as a function of the m ratios. A distance is calculated between the r(j,i) calculated for each ion i and the expected $r^q(j,i)$. The uncertainty weight $$w_i^{Fmlr}$$

is calculated from an inverse of the distance.

In various embodiments, the concentration of the compound of interest for a sample is found by comparing the uncertainty weighted average of inferred amounts, X, to a standard calibration curve for the reference ion j.

Experimental Results

A TOF-MS/MS dataset of Atorvastatin was analyzed. The sample set included 20 dilutions, with concentration ratios to the internal standards varying by ~9 orders of magnitude. Each concentration had three replicates.

Figure 4:
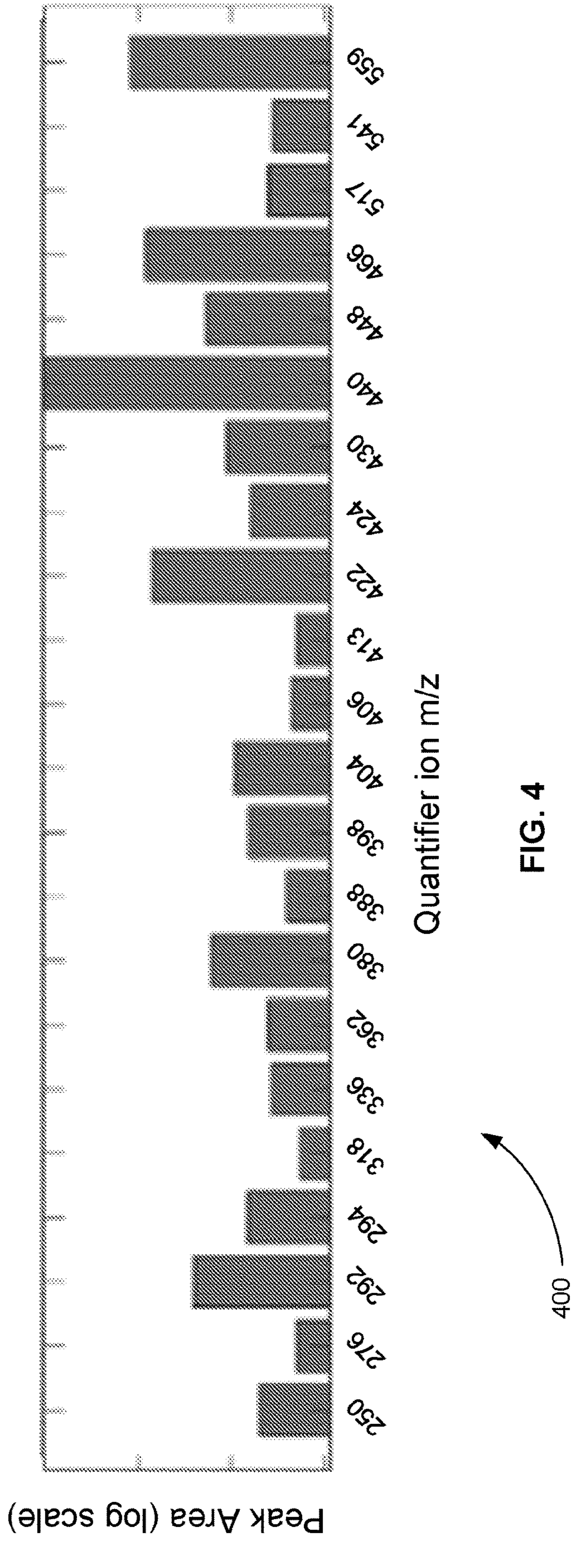
FIG. 4 is an exemplary plot showing the relative peak areas (on a logarithmic scale) of the 22 quantifier ions used to quantitate Atorvastatin, in accordance with various embodiments.

FIG. 4 is an exemplary plot 400 showing the relative peak areas (on a logarithmic scale) of the 22 quantifier ions used to quantitate Atorvastatin, in accordance with various embodiments. Plot 400 shows that the quantifier ion at 440 m/z is the most intense ion.

Figure 5:
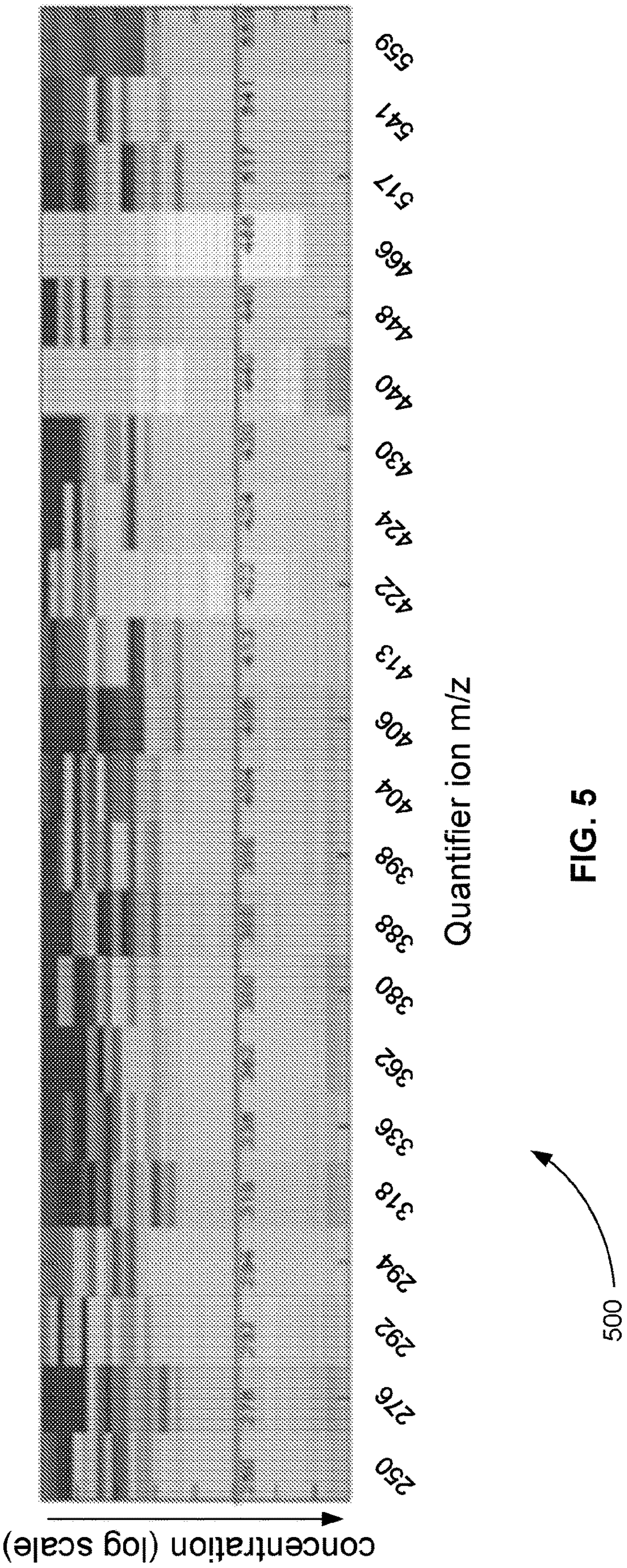
FIG. 5 is an exemplary heat map showing how the concentration variation (CV) of the 22 quantifier ions used to quantitate Atorvastatin varied with concentration (on a logarithmic scale), in accordance with various embodiments.

FIG. 5 is an exemplary heat map 500 showing how the CV of the 22 quantifier ions used to quantitate Atorvastatin varied with concentration (on a logarithmic scale), in accordance with various embodiments. Lighter areas correspond to a good CV. Heat map 500 shows, for example, how the CV of the most intense quantifier ion at 440 m/z is good until the ion saturates at the highest concentrations.

Figure 6:
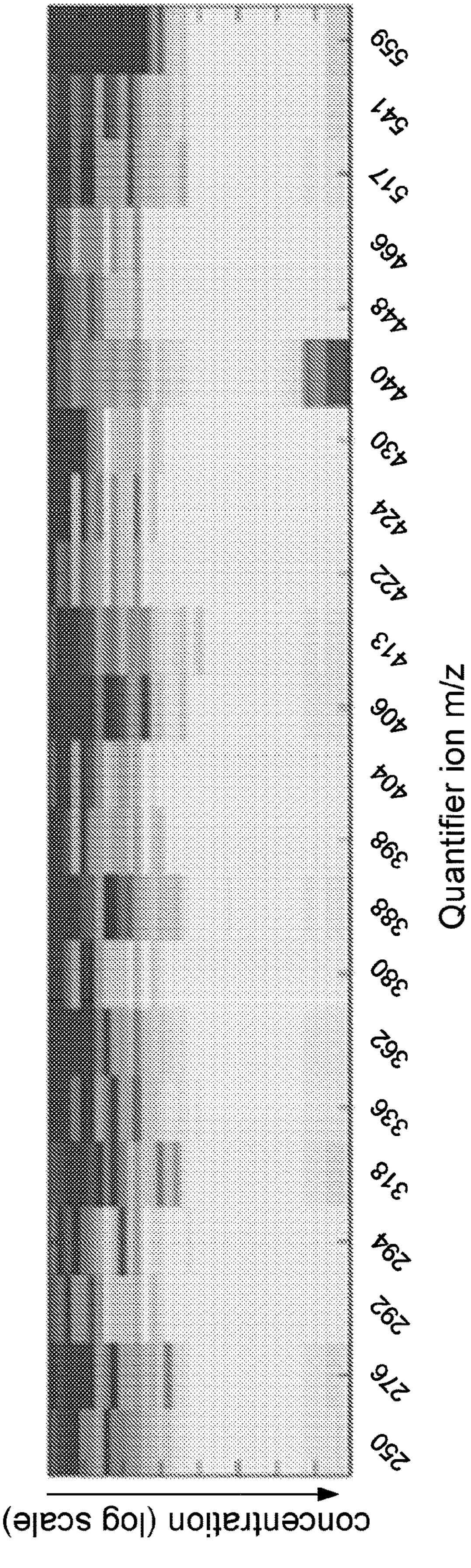
FIG. 6 is an exemplary heat map showing how the LDR of the 22 quantifier ions used to quantitate Atorvastatin varied with concentration (on a logarithmic scale), in accordance with various embodiments.

FIG. 6 is an exemplary heat map 600 showing how the LDR of the 22 quantifier ions used to quantitate Atorvastatin varied with concentration (on a logarithmic scale), in accordance with various embodiments. Lighter areas correspond to concentrations where the quantifier ion is within the LDR. Heat map 600 shows, for example, how the most intense quantifier ion at 440 m/z falls out of the LDR as it saturates at the highest concentrations.

How close a quantifier ion is to the linear dynamic range is referred to as accuracy or percentage accuracy. The expected LDR is known. The expected LDR is subtracted from the measured LDR to obtain the error. The lightest areas of heat map 600 represent an LDR error within 20% of zero, for example.

Figure 7:
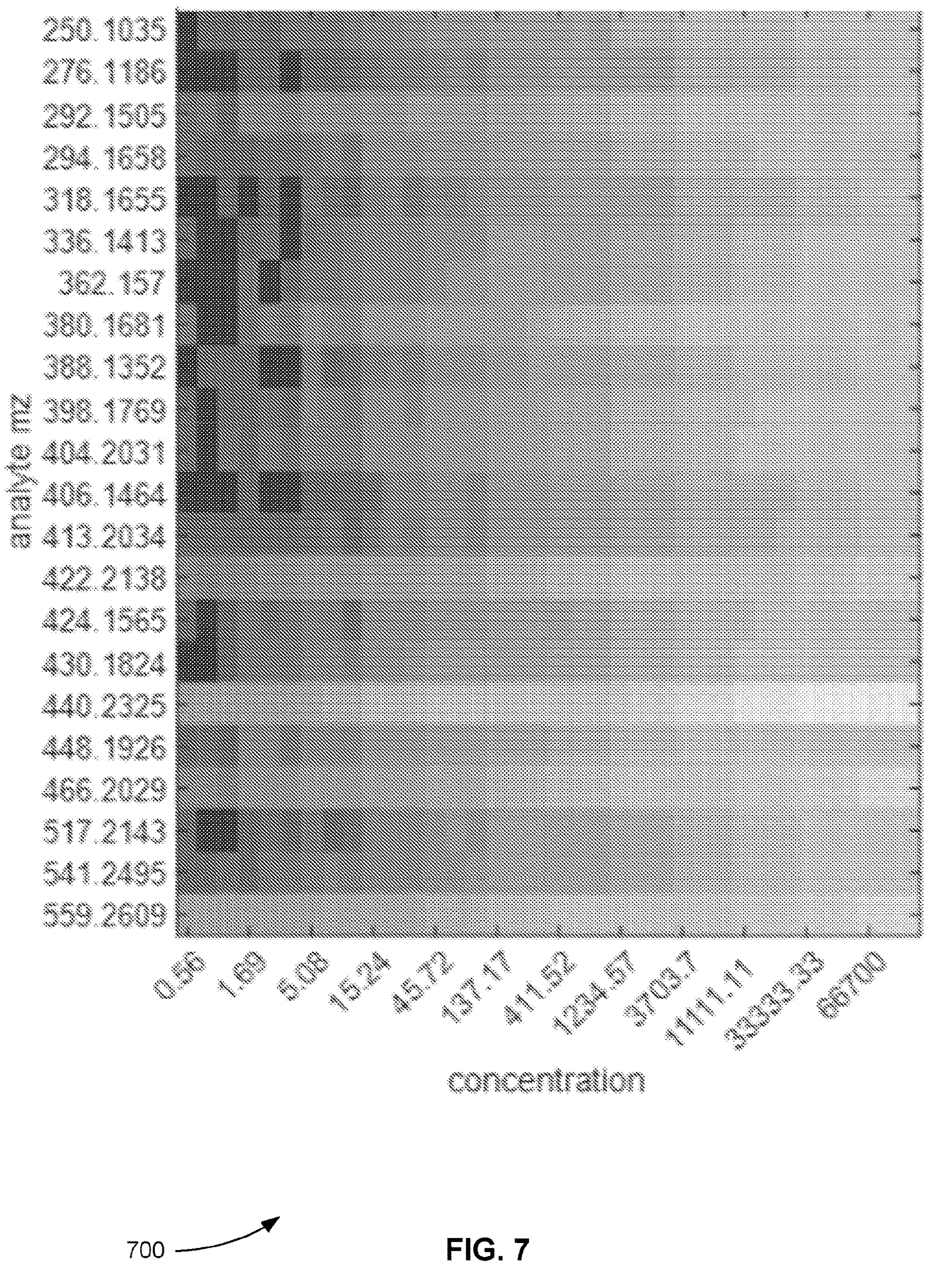
FIG. 7 is an exemplary heat map showing how the measured peak area of the 22 quantifier ions used to quantitate Atorvastatin varied with concentration, in accordance with various embodiments.

FIG. 7 is an exemplary heat map 700 showing how the measured peak area of the 22 quantifier ions used to quantitate Atorvastatin varied with concentration, in accordance with various embodiments. Lighter areas correspond to larger peak areas. Heat map 700 shows, for example, that the rate of peak area increase with concentration and the maximum peak area vary among the 22 quantifier ions. The most intense quantifier ion at 440 m/z has both the highest rate of peak area increase with concentration and the largest the maximum peak area.

Figure 8:
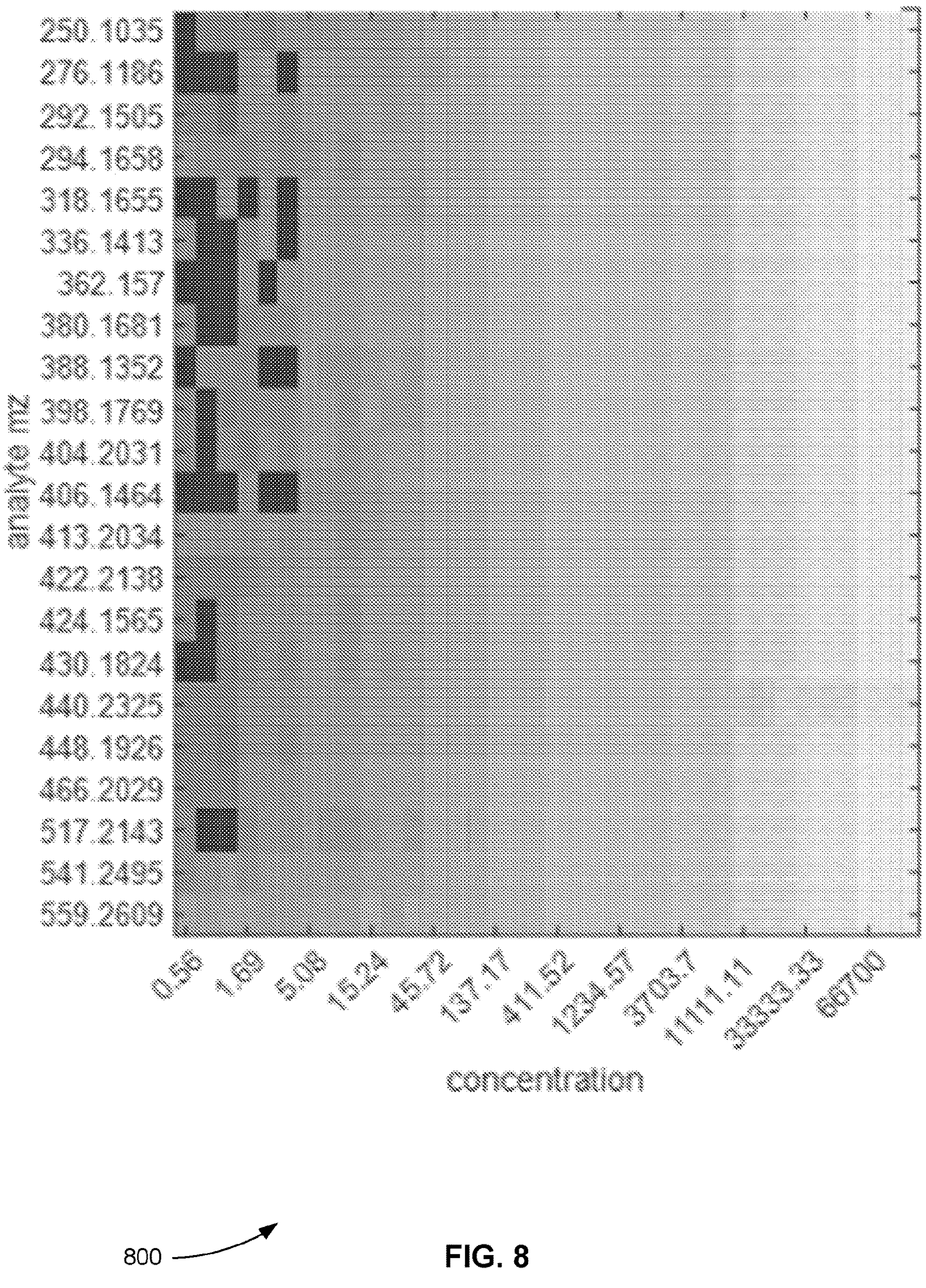
FIG. 8 is an exemplary heat map showing how the equalized peak area of the 22 quantifier ions used to quantitate Atorvastatin varied with concentration, in accordance with various embodiments.

FIG. 8 is an exemplary heat map 800 showing how the equalized peak area of the 22 quantifier ions used to quantitate Atorvastatin varied with concentration, in accordance with various embodiments. Lighter areas correspond to larger peak areas. As described above, the peak area of each quantifier ion is equalized by multiplying the measured area by the expected ratio $r^q(j,i)$ of the number of molecules or area of the reference ion, j, to the number of molecules or area of the quantifier ion i. Also, as described above, the expected ratio $r^q(j,i)$ is preferably found using the MLR from the experimental data. Heat map 800 shows, for example, that the rate of peak area increase with concentration and the maximum peak area is now equalized among the 22 quantifier ions. The rate of peak area increase and the maximum peak area are equalized to the reference ion, j.

In this case, the reference ion, j, was the quantifier ion at 559 m/z. The ratios of the area of the quantifier ion at 559 m/z to the area of each of the 22 quantifier ions were found using MLR.

As described above, the reference ion is preferably chosen to produce the smallest maximum peak area difference with any other ion. Another way of describing this is that the reference ion is preferably chosen to be the quantifier ion with a peak area nearest the average of the highest peak area and the lowest peak area.

Using the equalized peak areas of FIG. 8, a consensus quantity or uncertainty weighted average of the equalized peak areas of the 22 quantifier ions was calculated for each concentration. As described above, this consensus response was calculated using:

$$X = \frac{1}{\sum_{i=1:n} w_i} \sum_{i=1:n} w_i * r^q(j,i) * \text{Area}(i)$$

where $w_i$ is the calculated $$w_i^{Fmlr},$$

described above.

Figure 9:
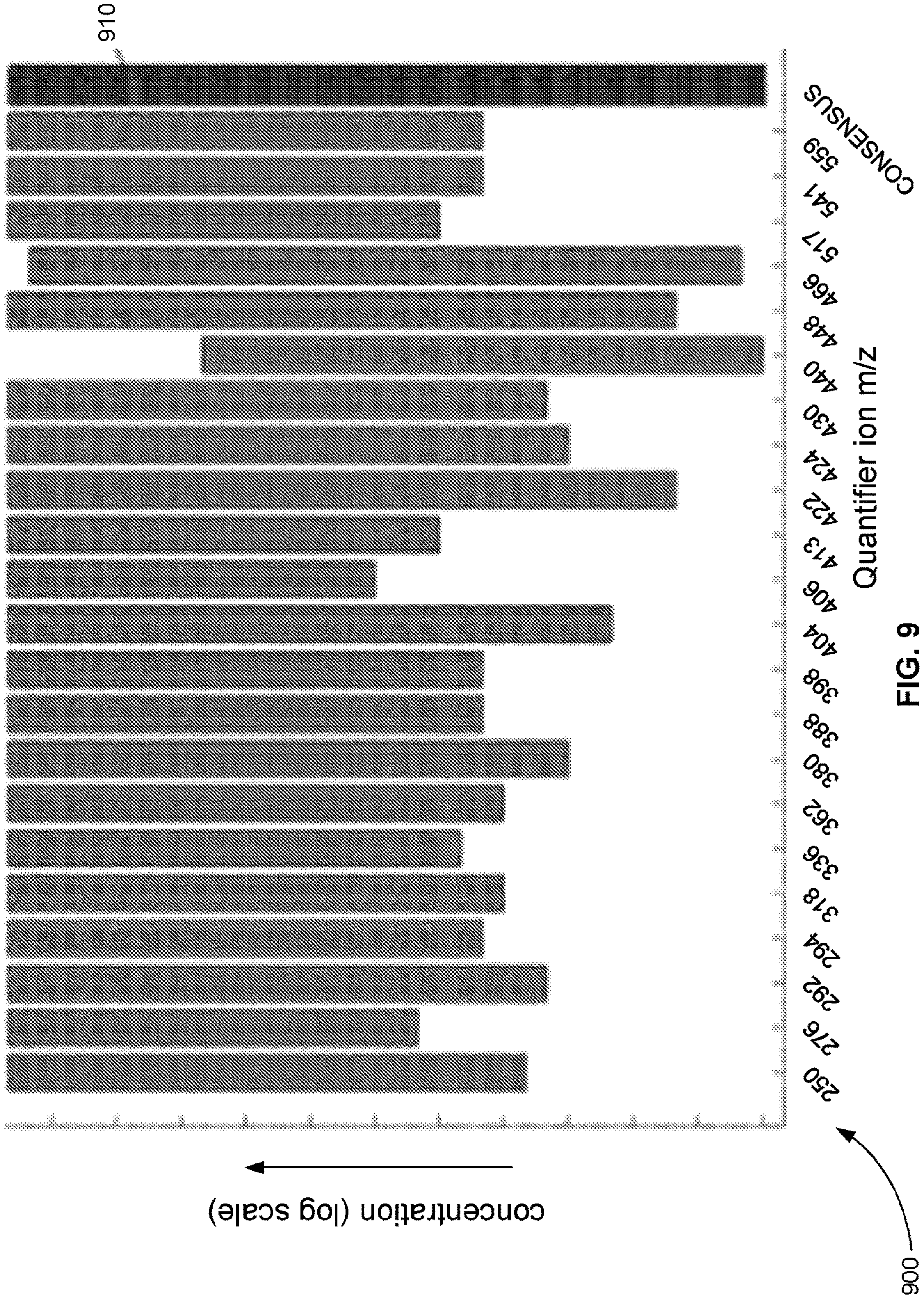
FIG. 9 is an exemplary plot showing how the concentration range or limit of quantitation (LOQ) of the 22 individual quantifier ions used to quantitate Atorvastatin varied with concentration (on a logarithmic scale) in comparison to the consensus quantity, in accordance with various embodiments.

FIG. 9 is an exemplary plot 900 showing how the concentration range or limit of quantitation (LOQ) of the 22 individual quantifier ions used to quantitate Atorvastatin varied with concentration (on a logarithmic scale) in comparison to the consensus quantity, in accordance with various embodiments. Plot 900 shows that consensus quantity 910 has a greater concentration range than any of the 22 individual quantifier ions. In other words, the uncertainty weighted average of the equalized peak areas of the 22 quantifier ions has a larger concentration range than any of the individual ions.

Consensus quantity 910 reaches the lowest concentration levels only reached by the most intense quantifier ion at 440 m/z. Consensus quantity 910 also, however, extends to the highest concentration levels reached by most of the other quantifier ions. As a result, plot 900 shows that consensus quantity 910 produces an improvement in LOQ over any individual quantifier ion.

Figure 10:
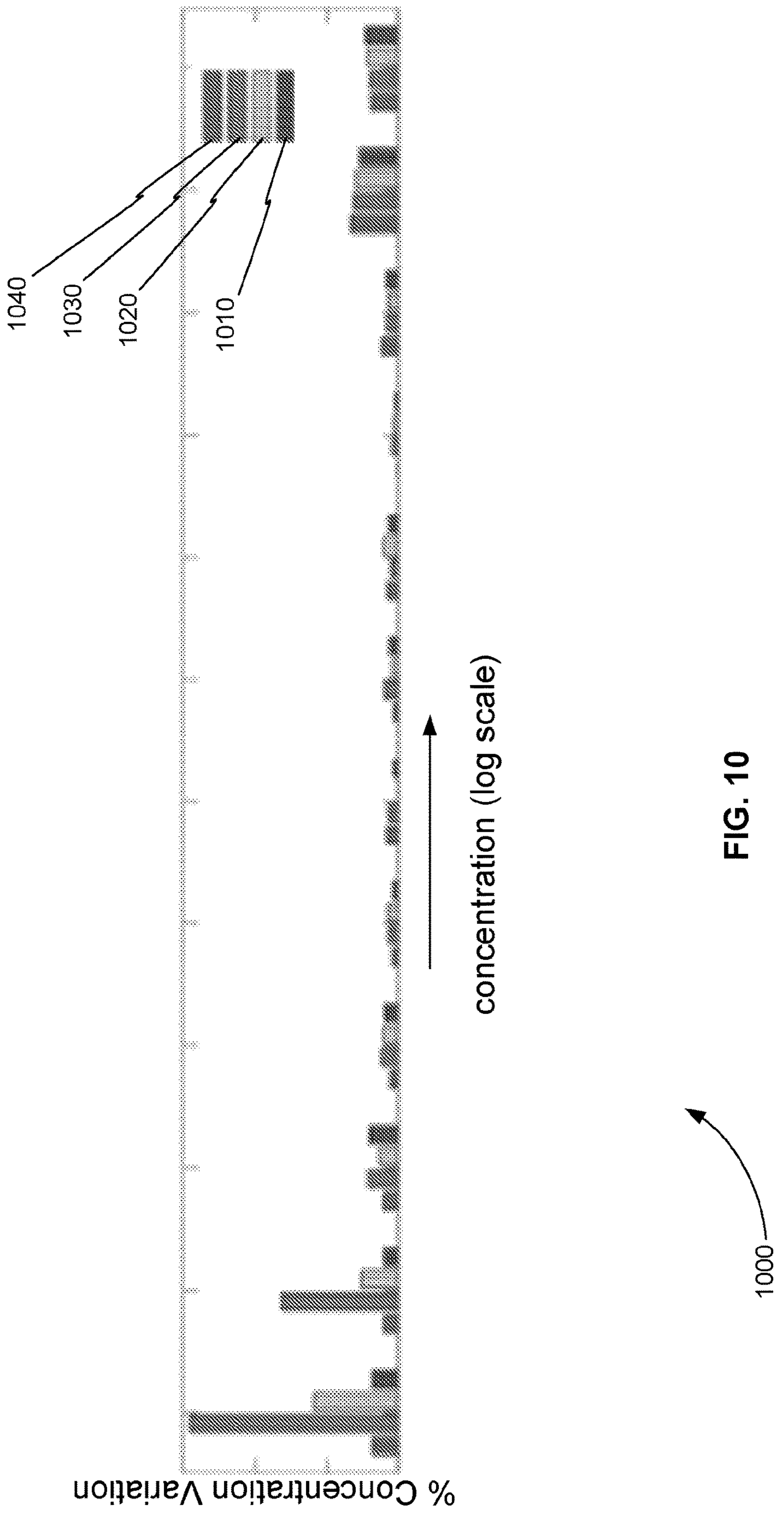
FIG. 10 is an exemplary plot of percentage CV versus concentration for three individual quantifier ions and the consensus quantity, in accordance with various embodiments.

FIG. 10 is an exemplary plot 1000 of percentage CV versus concentration for three individual quantifier ions and the consensus quantity, in accordance with various embodiments. Plot 1000 includes percentage CV values for individual quantifier ion 1020 at 466 m/z, individual quantifier ion 1030 at 448 m/z, individual quantifier ion 1040 at 440 m/z, and for consensus quantity 1010. Plot 1000 shows that consensus quantity 1010 has a lower percentage CV at both high and low concentrations. None of the individual quantifier ions produces such a low percentage CV at both high and low concentrations.

Figure 11:
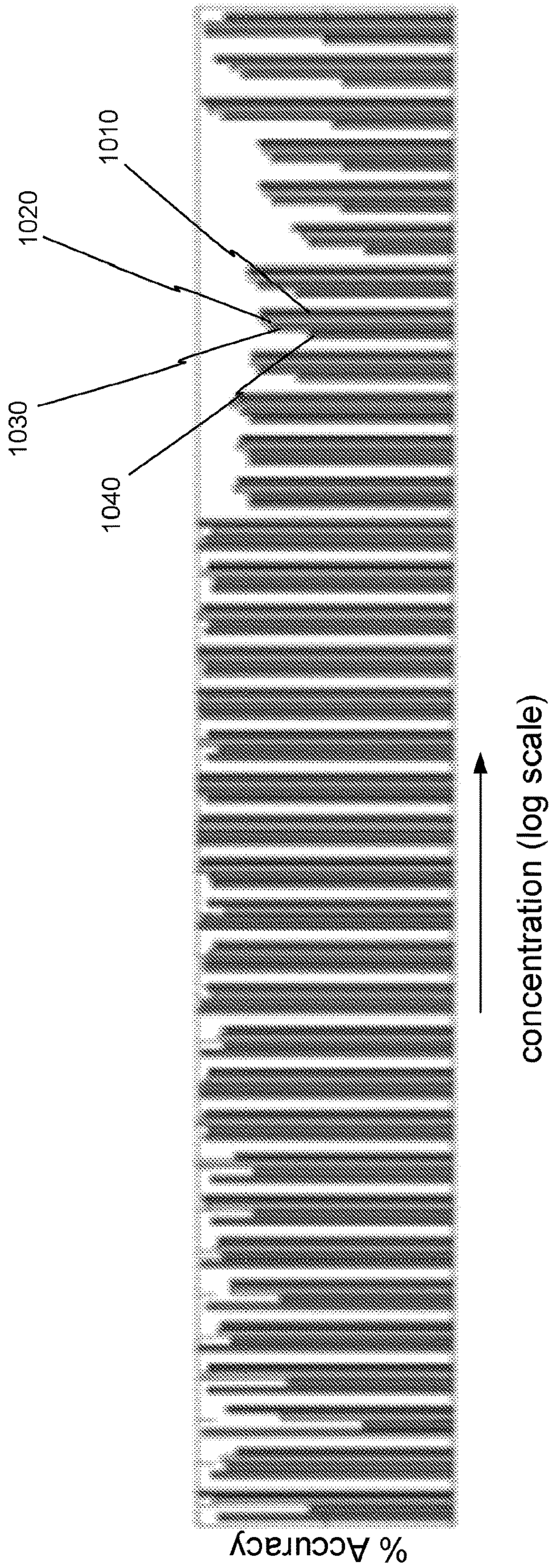
FIG. 11 is an exemplary plot of percentage accuracy versus concentration for three individual quantifier ions and the consensus quantity, in accordance with various embodiments.

FIG. 11 is an exemplary plot 1100 of percentage accuracy versus concentration for three individual quantifier ions and the consensus quantity, in accordance with various embodiments. Plot 1100 includes percentage accuracy values for individual quantifier ion 1020 at 466 m/z, individual quantifier ion 1030 at 448 m/z, individual quantifier ion 1040 at 440 m/z, and for consensus quantity 1010. As described above, how close a quantifier ion is to the linear dynamic range is referred to as accuracy or percentage accuracy. In plot 1100, a higher percentage accuracy means that an ion or the consensus is closer to the expected linear dynamic range. Plot 1100 shows that consensus quantity 1010 has a higher percentage accuracy for a larger concentration range than any individual quantifier ion.

The plots of FIGS. 9-11 show that the consensus quantity of the Atorvastatin experiment provided a longer LOQ, a lower percentage CV at both high and low concentration, and a higher percentage accuracy for a larger concentration range than any individual quantifier ion. In other words, FIGS. 9-11 show that consensus quantity 1010 provided an extended and more accurate dynamic range and provided less concentration variation than any individual ion.

System for Extending the Dynamic Range

Figure 12:
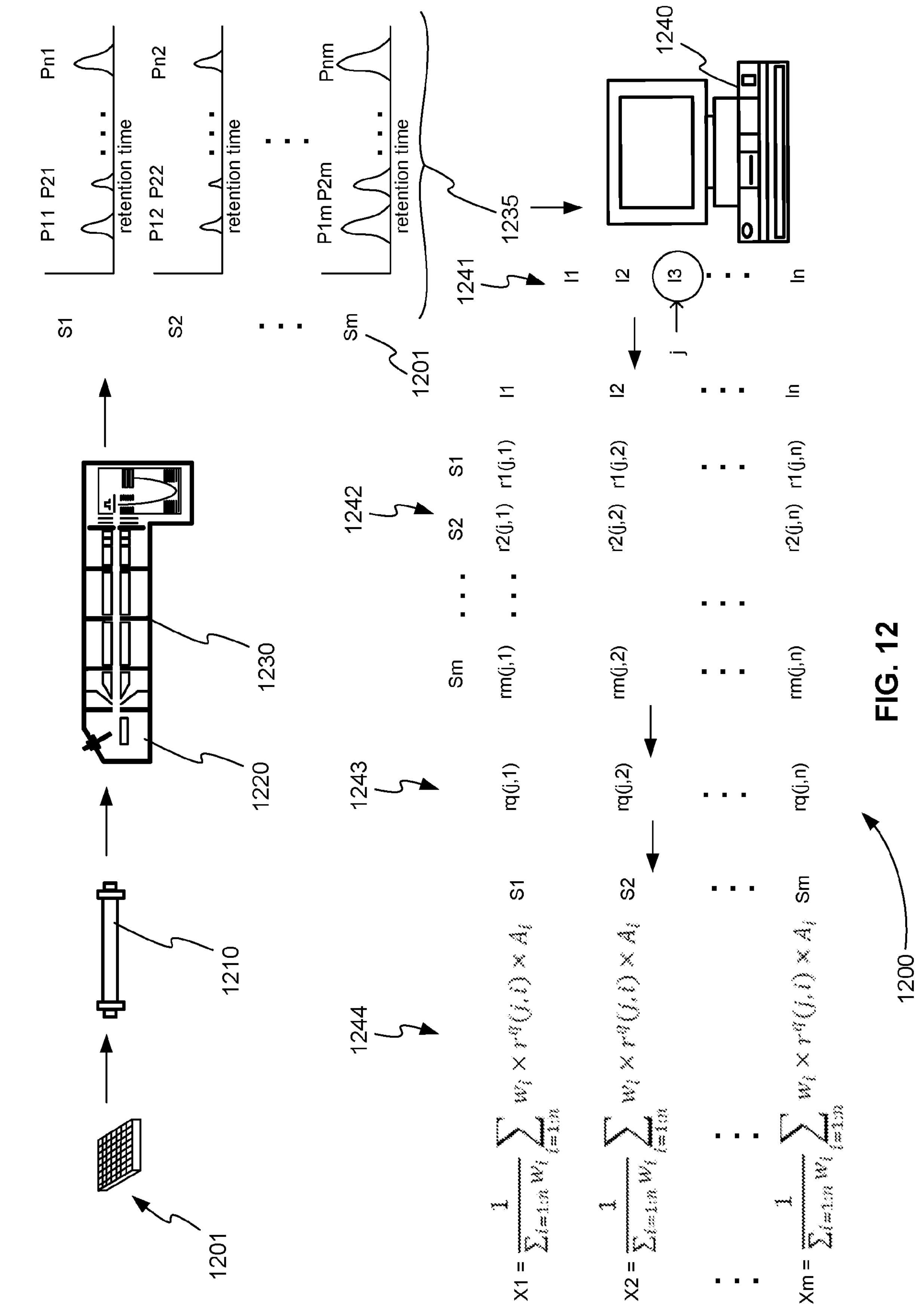
FIG. 12 is a schematic diagram showing a system for calculating an uncertainty weighted average of the equalized amounts of two or more quantifier ions from a quantitation experiment itself, in accordance with various embodiments.

FIG. 12 is a schematic diagram 1200 showing a system for calculating an uncertainty weighted average of the equalized amounts of two or more quantifier ions from a quantitation experiment itself, in accordance with various embodiments. The system of FIG. 12 includes mass spectrometer 1230 and processor 1240.

Mass spectrometer 1230 mass analyzes n known i ions of a compound of interest over time in each of m different experimental samples 1201, producing peaks 1235. Peaks 1235 include n extracted ion chromatogram (XIC) peaks for each of the m different samples 1201.

Mass spectrometer 1230 is shown as a QqTOF device. One of ordinary skill in the art can appreciate that mass spectrometer 1230 can include other types of mass spectrometry devices including, but not limited to, ion traps, orbitraps, QqQ devices, QqLIT devices, or Fourier transform ion cyclotron resonance (FT-ICR) devices.

In various embodiments, the system of FIG. 12 further includes a sample introduction device 1210 and an ion source device 1220. Sample introduction device 1210 introduces each sample that includes the compound of interest to the system over time. A sample is obtained from a sample plate, for example. Sample introduction device 1210 can perform techniques that include, but are not limited to, ion mobility, gas chromatography (GC), liquid chromatography (LC), capillary electrophoresis (CE), acoustic ejection mass spectrometry (AEMS), or flow injection analysis (FIA).

Ion source device 1220 ionizes compounds of a sample to transform the compounds into an ion beam. Ion source device 1220 can perform ionization techniques that include, but are not limited to, matrix-assisted laser desorption/ionization (MALDI) or electrospray ionization (ESI).

Processor 1240 can be, but is not limited to, a computer, a microprocessor, the computer system of FIG. 1, or any device capable of sending and receiving control signals and data from mass spectrometer 1230 and processing data. Processor 1240 is in communication with mass spectrometer 1230.

In step 1241, processor 1240 selects a reference ion j. In a preferred embodiment, processor 1240 selects a j ion of the n i ions as the reference ion. Any of the n i ions can be selected as a reference ion. In various embodiments, processor 1240 selects the j ion by calculating a maximum difference in a peak area of each ion of the n i ions to a peak area of every other ion of the n i ions in one or more samples of the m samples. Processor 1240 then selects an ion of the n i ions that produces the smallest maximum peak difference in the one or more samples of the m samples.

In another embodiment, the reference ion j can be a hypothetical ion. For example, the j ion can be a hypothetical ion with 100% ion efficiency. As a result, all n ions can be equalized to one of them or to some hypothetical representative (like a 45 degree ionization efficiency line).

In step 1242, processor 1240 calculates a ratio r(j,i) of a peak area of the j ion to a peak area of each ion of the n i ions for each of m samples 1201. In step 1242, m r(j,i) ratios are produced for each of the n i ions.

In step 1243, processor 1240 calculates an expected ratio $r^q$(j,i) for each ion of the n i ions from the m r(j,i) ratios for each of the n i ions. In various embodiments, processor 1240 calculates the expected ratio $r^q$(j,i) as the most frequently occurring or mode of the m ratios r(j,i) for each ion.

In step 1244, for each sample of the m samples, processor 1240 calculates an uncertainty weighted average quantity, X, equalized to the j ion from $$X = \frac{1}{\Sigma_{i=1:n} w_i} \sum_{i=1:n} w_i \times r^q(j, i) \times A_i,$$

where $w_i$ is an uncertainty weight between 0 and 1 for each ion of the n i ions for each sample with a value closer to 1 meaning less uncertainty and a value closer to 0 meaning more uncertainty. In various embodiments, processor 1240 calculates uncertainty weight $w_i$ by comparing the r(j,i) calculated for each ion of the n i ions for each sample to the expected $r^q$(j,i). A value closer to 1 means that the ratios are more equivalent, and a value closer to 0 means that the ratios are less equivalent.

In various embodiments, processor 1240 compares the r(j,i) calculated for each ion of the n i ions for each sample to the expected $r^q$(j,i) by calculating a histogram of the m r(j,i) ratios r(j,i) for each ion that provides the number of occurrences of each ratio of the m r(j,i) ratios as a function of the m r(j,i) ratios. Processor 1240 then calculates a distance between the r(j,i) calculated and the expected $r^q$(j,i). Finally, processor 1240 calculates the uncertainty weight $w_i$ from an inverse of the distance.

In various embodiments, as described above, the n i ions can include a product ion of the compound or an isotope of the precursor ion of the compound or an isotope of a product ion of the compound. If an experiment is DDA (IDA), then quantitation is often done from using mass spectrometry (MS) only, so a precursor ion and its isotopes are analyzed. Also, adducts/losses and their isotopes that are related to the amount of the compound can be analyzed as well.

If an experiment is DIA, MRM, or MRM-HR (scheduled or not), fragment or product ions are produced and analyzed. If an experiment is DIA or MRM-HR, product ions and their isotopes are available for quantitation.

Method for Extending the Dynamic Range

Figure 13:
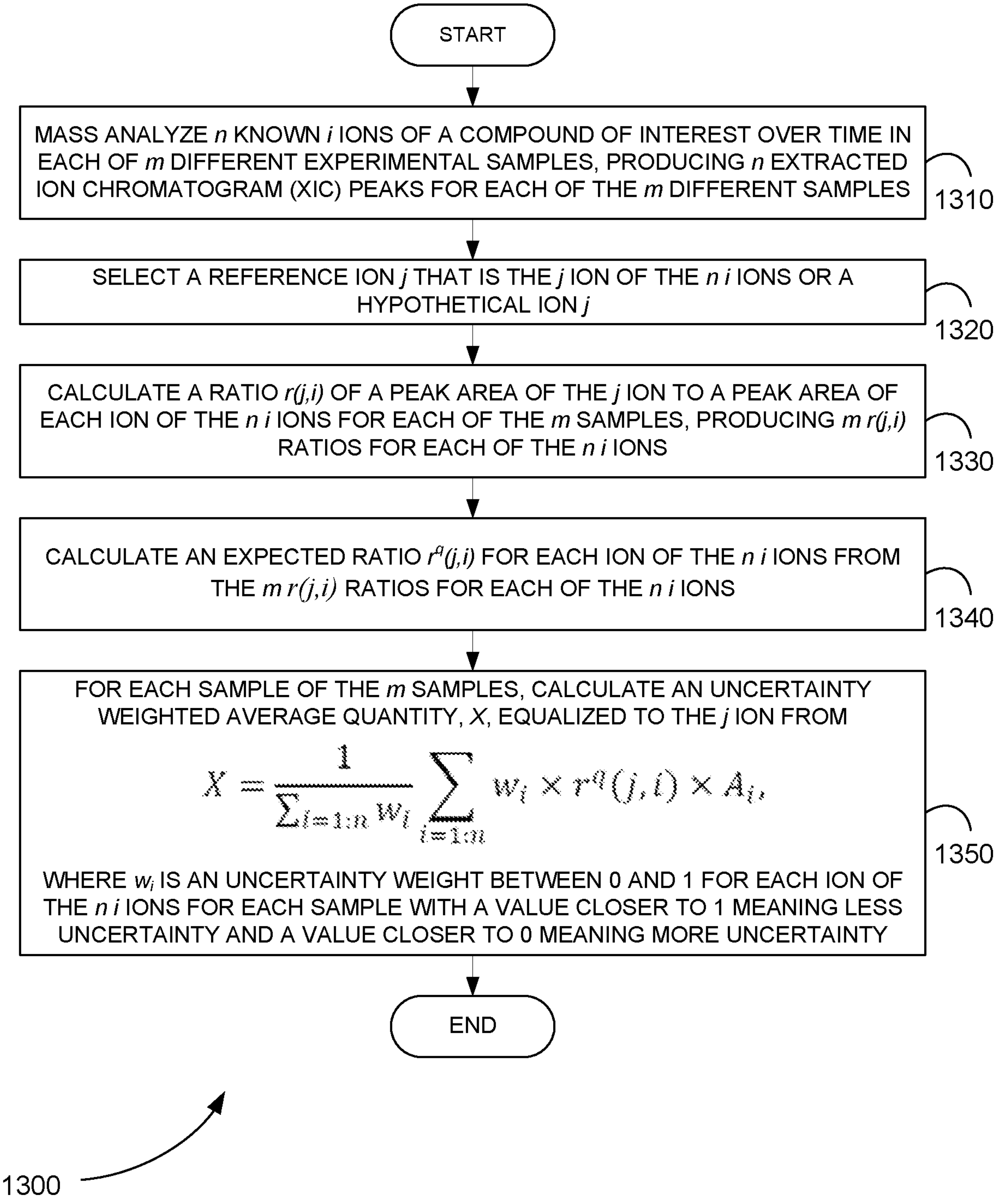
FIG. 13 is a flowchart showing a method for calculating an uncertainty weighted average of the equalized amounts of two or more quantifier ions from a quantitation experiment itself, in accordance with various embodiments.

FIG. 13 is a flowchart showing a method 1300 for calculating an uncertainty weighted average of the equalized amounts of two or more quantifier ions from a quantitation experiment itself, in accordance with various embodiments.

In step 1310 of method 1300, n known i ions of a compound of interest are mass analyzed over time in each of m different experimental samples, producing n XIC peaks for each of the m different samples.

In step 1320, a reference ion j is selected that is a j ion of the n i ions or a hypothetical ion j.

In step 1330, a ratio r(j,i) of a peak area of the j ion to a peak area of each ion of the n i ions is calculated for each of the m samples, producing m r(j,i) ratios for each of the n i ions.

In step 1340, an expected ratio $r^q$(j,i) is calculated for each ion of the n i ions from the m r(j,i) ratios for each of the n i ions.

In step 1350, for each sample of the m samples, an uncertainty weighted average quantity, X, equalized to the j ion is calculated from $$X = \frac{1}{\Sigma_{i=1:n} w_i} \sum_{i=1:n} w_i \times r^q(j, i) \times A_i,$$

where $w_i$ is an uncertainty weight between 0 and 1 for each ion of the n i ions for each sample with a value closer to 1 meaning less uncertainty and a value closer to 0 meaning more uncertainty.

Computer Program Product for Extending the Dynamic Range

In various embodiments, a computer program product includes a non-transitory tangible computer-readable storage medium whose contents include a program with instructions being executed on a processor so as to perform a method for calculating an uncertainty weighted average of the equalized amounts of two or more quantifier ions from a quantitation experiment itself. This method is performed by a system that includes one or more distinct software modules.

Figure 14:
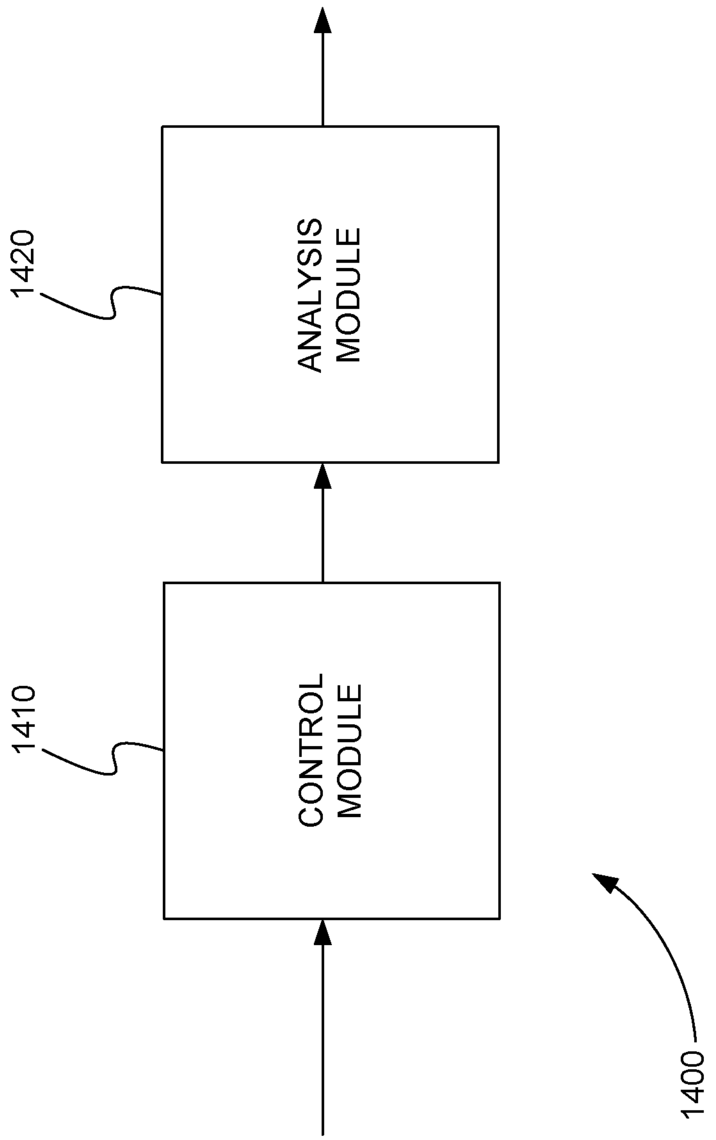
FIG. 14 is a schematic diagram of a system that includes one or more distinct software modules that performs a method for calculating an uncertainty weighted average of the equalized amounts of two or more quantifier ions from a quantitation experiment itself, in accordance with various embodiments.

FIG. 14 is a schematic diagram of a system 1400 that includes one or more distinct software modules that performs a method for calculating an uncertainty weighted average of the equalized amounts of two or more quantifier ions from a quantitation experiment itself, in accordance with various embodiments. System 1400 includes control module 1410 and analysis module 1420.

Control module 1410 instructs a mass spectrometer to mass analyze n known i ions of a compound of interest over time in each of m different experimental samples, producing n XIC peaks for each of the m different samples.

Analysis module 1420 selects a reference ion j that is a j ion of the n i ions or a hypothetical ion j. Analysis module 1420 calculates a ratio r(j,i) of a peak area of the j ion to a peak area of each ion of the n i ions for each of the m samples, producing m r(j,i) ratios for each of the n i ions. Analysis module 1420 calculates an expected ratio $r^q$(j,i) for each ion of the n i ions from the m r(j,i) ratios for each of the n i ions. Finally, analysis module 1420, for each sample of the m samples, calculates an uncertainty weighted average quantity, X, equalized to the j ion from $$X = \frac{1}{\Sigma_{i=1:n} w_i} \sum_{i=1:n} w_i \times r^q(j, i) \times A_i,$$

where $w_i$ is an uncertainty weight between 0 and 1 for each ion of the n i ions for each sample with a value closer to 1 meaning less uncertainty and a value closer to 0 meaning more uncertainty.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. A mass spectrometry system, comprising:

a mass spectrometer that mass analyzes n known types of ions of a compound of interest over time in each of m different experimental samples, producing n extracted ion chromatogram (XIC) peaks for each of the m different samples, each type of ion having a numerical label i; and a processor that:

selects a reference ion j that is a j ion of the n types of ions or a hypothetical ion j;

calculates a ratio r(j,i) of a peak area of the j ion to a peak area of each ion of the n types of ions for each of the m samples, producing m r(j,i) ratios for each of the n types of ions;

calculates an expected ratio $r^q$(j,i) for each ion of the n types of ions from the m r(j,i) ratios for each of the n types of ions; and for each sample of the m samples, calculates an uncertainty weighted average quantity, X, from $$X = \frac{1}{\Sigma_{i=1:n} w_i} \sum_{i=1:n} w_i \times r^q(j, i) \times A_i,$$

where $w_i$ is an uncertainty weight between 0 and 1 for each ion of the n ions for the each sample with a value closer to 1 meaning less uncertainty and a value closer to 0 meaning more uncertainty, and where $A_i$ is a peak area for each of the n types of ions.

2. The system of claim 1, wherein the processor calculates an expected ratio $r^q$(j,i) for each ion of the n types of ions by calculating a mode of the m r(j,i) ratios for the each ion.

3. The system of claim 1, wherein the processor calculates uncertainty weight $w_i$ by comparing the r(j,i) calculated for each ion of the n types of ions for the each sample to the expected $r^q$ (j,i) with a value closer to 1 meaning more equivalent ratios and a value closer to 0 meaning less equivalent ratios.

4. The system of claim 3, wherein comparing the r(j,i) calculated for each ion of the n types of ions for the each sample to the expected $r^q$(j,i) comprises calculating a histogram of the m r(j,i) ratios r(j,i) for the each ion that provides the number of occurrences of each ratio of the m r(j,i) ratios as a function of the m r(j,i) ratios, calculating a distance between the r(j,i) calculated and the expected $r^q$ (j,i), and calculating the uncertainty weight $w_i$ from an inverse of the distance.

5. The system of claim 1, wherein the processor selects a reference ion j that is a j ion of the n types of ions by calculating a maximum difference in a peak area of each ion of the n types of ions to a peak area of every other ion of the n types of ions in one or more samples of the m samples, and selecting an ion of the n types of ions that produces the smallest maximum peak difference in the one or more samples of the m samples.

6. The system of claim 1, wherein one or more of the n types of ions comprise a product ion of the compound.

7. The system of claim 1, wherein one or more of the n types of ions comprise an isotope of the precursor ion of the compound or an isotope of a product ion of the compound.

8. A method of mass spectrometry, comprising:

mass analyzing n known types of ions of a compound of interest over time in each of m different experimental samples, producing n extracted ion chromatogram (XIC) peaks for each of the m different samples, each type of ion having a numerical label i;

selecting a reference ion j that is a j ion of the n types of ions or a hypothetical ion j;

calculating a ratio r(j,i) of a peak area of the j ion to a peak area of each ion of the n types of ions for each of the m samples, producing m r(j,i) ratios for each of the n types of ions;

calculating an expected ratio $r^q$ (j,i) for each ion of the n types of ions from the m r(j,i) ratios for each of the n types of ions; and for each sample of the m samples, calculating an uncertainty weighted average quantity, X, from $$X = \frac{1}{\sum_{i=1:n} w_i} \sum_{i=1:n} w_i \times r^q(j, i) \times A_i,$$

where $w_i$ is an uncertainty weight between 0 and 1 for each ion of the n types of ions for the each sample with a value closer to 1 meaning less uncertainty and a value closer to 0 meaning more uncertainty, and where $A_i$ is a peak area for each of the n types of ions.

9. The method of claim 8, wherein calculating an expected ratio $r^q$ (j,i) for each ion of the n types of ions by calculating a mode of the m r(j,i) ratios for the each ion.

10. The method of claim 8, wherein uncertainty weight $w_i$ is calculated by comparing the r(j,i) calculated for each ion of the n types of ions for the each sample to the expected $r^q$ (j,i) with a value closer to 1 meaning more equivalent ratios and a value closer to 0 meaning less equivalent ratios.

11. The method of claim 10, wherein comparing the r(j,i) calculated for each ion of the n types of ions for the each sample to the expected $r^q$(j,i) comprises calculating a histogram of the m r(j,i) ratios r(j,i) for the each ion that provides the number of occurrences of each ratio of the m r(j,i) ratios as a function of the m r(j,i) ratios, calculating a distance between the r(j,i) calculated and the expected $r^q$ (j,i), and calculating the uncertainty weight $w_i$ from an inverse of the distance.

12. The method of claim 8, wherein selecting a reference ion j that is a j ion of the n types of ions comprises calculating a maximum difference in a peak area of each ion of the n types of ions to a peak area of every other ion of the n types of ions in one or more samples of the m samples, and selecting an ion of the n types of ions that produces the smallest maximum peak difference in the one or more samples of the m samples.

13. The method of claim 8, wherein one or more of the n types of ions comprise a product ion of the compound.

14. The method of claim 8, wherein one or more of the n types of ions comprise an isotope of the precursor ion of the compound or an isotope of a product ion of the compound.

15. A computer program product, comprising a non-transitory tangible computer-readable storage medium whose contents include a program with instructions being executed on a processor for a mass spectrometry method, comprising:

providing a system, wherein the system comprises one or more distinct software modules, and wherein the distinct software modules comprise a control module and an analysis module;

instructing a mass spectrometer to mass analyze n known types of ions of a compound of interest over time in each of m different experimental samples using the control module, producing n extracted ion chromatogram (XIC) peaks for each of the m different samples, each type of ion having a numerical label i;

selecting a reference ion j that is a j ion of the n types of ions or a hypothetical ion j using the analysis module;

calculating a ratio r(j,i) of a peak area of the j ion to a peak area of each ion of the n types of ions for each of the m samples using the analysis module, producing m r(j,i) ratios for each of the n types of ions;

calculating an expected ratio $r^q$ (j,i) for each ion of the n types of ions from the m r(j,i) ratios for each of the n types of ions using the analysis module; and for each sample of the m samples, calculating an uncertainty weighted average quantity, X, from $$X = \frac{1}{\sum_{i=1:n} w_i} \sum_{i=1:n} w_i \times r^q(j, i) \times A_i$$

using the analysis module, where $w_i$ is an uncertainty weight between 0 and 1 for each ion of the n types of ions for the each sample with a value closer to 1 meaning less uncertainty and a value closer to 0 meaning more uncertainty, and where $A_i$ is a peak area for each of the n types of ions.

* * * * *